(12) United States Patent
Ohtsuki (10) Patent No.: US 7,032,379 B2
(45) Date of Patent: Apr. 25, 2006

(54) OIL SUPPLY UNIT FOR A RUNNING POWER TRANSMISSION

(76) Inventor: Kazuhiko Ohtsuki, 18-1, Inadera 2-Chome, Amagasaki-shi, Hyogo (JP) 661-0981

( * ) Notice: Subject to any disclaimer, the term of this patent is extended or adjusted under 35 U.S.C. 154(b) by 78 days.

(21) Appl. No.: 10/819,155

(22) Filed: Apr. 7, 2004

(65) Prior Publication Data

US 2004/0211174 A1 Oct. 28, 2004

(30) Foreign Application Priority Data

Apr. 22, 2003 (JP) ............................. 2003-117232

(51) Int. Cl.
*F16D 31/02* (2006.01)

(52) U.S. Cl. .......................................... 60/449; 60/431
(58) Field of Classification Search .................. 60/431, 60/435, 447, 449, 456
See application file for complete search history.

(56) References Cited

U.S. PATENT DOCUMENTS

| 2,389,473 | A | * | 11/1945 | Vickers ........................ 60/446 |
| 3,612,202 | A | * | 10/1971 | Moon et al. ................... 60/431 |
| 4,613,024 | A | * | 9/1986 | Irikura et al. ............. 192/18 A |
| 4,974,472 | A | * | 12/1990 | Nishimura et al. ........... 74/718 |
| 6,419,041 | B1 | * | 7/2002 | Nemoto ....................... 180/377 |

* cited by examiner

*Primary Examiner*—Edward K. Look
*Assistant Examiner*—Michael Leslie
(74) *Attorney, Agent, or Firm*—Sterne, Kessler, Goldstein & Fox P.L.L.C.

(57) ABSTRACT

There is provided an oil supply unit for a running power transmission of a vehicle. The oil supply unit includes a housing, a hydraulic pump of a variable displacement type, a detecting mechanism and a control mechanism. The detecting mechanism is constructed to monitor a driven state of an engine. The control mechanism is constructed to operate an output adjusting member of the hydraulic pump to thereby regulate the discharge quantity against the suction quantity of the hydraulic pump based on the driven state of the engine.

12 Claims, 10 Drawing Sheets

OIL SUPPLY UNIT FOR A RUNNING POWER TRANSMISSION

BACKGROUND OF THE INVENTION

1. Field of the Invention

The present invention relates to an oil supply unit for a running power transmission of a vehicle. The oil supply unit includes a hydraulic pump which is operatively connected to an engine and which supplies discharged oil to a power transmission portion in a power transmission mechanism.

2. Related Art

An oil supply unit including a hydraulic pump operatively connected to an engine is conventionally utilized in various fields such as a working vehicle.

For example, the oil supply unit is formed so as to supply discharged oil from the hydraulic pump as hydraulic fluid and lubricating oil for a hydraulic actuator such as a forward/reverse switching device and/or a PTO clutch and, also, to supply the discharged oil as lubricating oil for a member to be lubricated such as a mechanical transmission which requires lubrication.

However, there is a problem of large power loss in the conventional oil supply unit, because a discharge quantity of the hydraulic pump is merely proportional to an engine speed.

In other words, in the conventional oil supply unit, the hydraulic pump is of a fixed displacement type; therefore, a discharged oil quantity of the hydraulic pump is simply proportional to the engine speed. In short, the discharge quantity of the hydraulic pump is the smallest when the engine is at idle and increases as the rotation speed increases from idle.

The oil quantity discharged from the hydraulic pump is set according to use of the discharged oil.

For example, an assumption is made that the discharged oil is utilized as hydraulic fluid for the hydraulic actuator such as the forward/reverse switching device and the PTO clutch and is also utilized as lubricating oil for the members to be lubricated such as the hydraulic actuator and the mechanical transmission.

In this case, if an amount of hydraulic fluid required by the hydraulic actuator is X1 m$^3$/s and an amount of lubricating oil required by the members to be lubricated is X2 m$^3$/s, the hydraulic pump is set to be able to discharge oil of X1 m$^3$/s+X2 m$^3$/s when the engine is at idle.

Because the discharge quantity of the hydraulic pump is proportional to the engine speed in the conventional oil supply unit as described above, the hydraulic pump discharges oil more than the required discharged amount X1 m$^3$/s+X2 m$^3$/s when the engine speed is increased. The surplus discharged oil merely circulates through an oil hydraulic circuit and is not used advantageously.

Because the hydraulic pump of the fixed displacement type is set to discharge the required amount of oil when the engine is at idle in the conventional oil supply unit as described above, if the engine speed is increased, useless oil according to the increase is discharged, which causes the power loss.

It has conventionally been proposed to utilize a housing for accommodating the power transmission mechanism as an oil source of the hydraulic pump.

With this structure, the housing is also used as an oil reservoir to thereby save space and reduce costs by using the member in two ways.

However, the oil stored in the housing causes stirring resistance to the power transmission housed in the housing, which results in further power loss in the above structure.

The present invention has been accomplished with the above conventional art in view and it is an object of the invention to reduce power loss in an oil supply unit formed to use discharged oil from a hydraulic pump operatively connected to an engine as hydraulic fluid and/or lubricating oil.

It is another object of the invention to prevent running out of oil and to reduce power loss when a housing for accommodating a power transmission mechanism is used as an oil source of the hydraulic pump.

SUMMARY OF THE INVENTION

According to the present invention, there is provided an oil supply unit that includes a housing, a hydraulic pump of a variable displacement type, a detecting mechanism and a control mechanism.

The housing is constructed to accommodate a power transmission mechanism which has a power transmission portion and an output portion and in which a driving force from the engine is transmitted to the output portion through the power transmission portion. The housing is also constructed so that at least a part of an inside space of the housing is an oil reservoir space.

The hydraulic pump of a variable displacement type is constructed to be operatively connected to the engine and include a suction port fluid-connected to the oil reservoir space, a discharge port fluid-connected to the power transmission portion and an output adjusting member. The discharge quantity against a suction quantity of the pump is variable based on operation of the output adjusting member.

The detecting mechanism is constructed to monitor a driven state of the engine.

The control mechanism is constructed to operate the output adjusting member to thereby regulate the discharge quantity against the suction quantity of the hydraulic pump of the variable displacement type based on the driven state of the engine.

With this structure, it is possible to effectively prevent the hydraulic pump from discharging an unnecessary surplus quantity of oil to thereby reduce power loss.

In one embodiment of the present invention, the power transmission portion has a drive-side member positioned on the engine side and a driven-side member positioned on the output portion side. The detecting mechanism is formed to directly or indirectly detect an engine speed. The control mechanism operates the output adjusting member so as to reduce the discharge quantity against the suction quantity of the hydraulic pump when the speed detected by the detecting mechanism exceeds a predetermined value.

Alternatively, the detecting mechanism may be formed to detect a load applied on the engine. In this embodiment, the control mechanism operates the output adjusting member so as to increase the discharge quantity against the suction quantity of the hydraulic pump when the load detected by the detecting mechanism exceeds a predetermined value.

Preferably, the oil reservoir space is divided into a first reservoir portion in which the power transmission portion is accommodated and a second reservoir portion in which the portion transmission portion is not accommodated. The housing is formed to be able to send oil from the first reservoir portion to the second reservoir portion by utilizing rotational motion of the power transmission mechanism.

With this preferred structure, it is possible to effectively reduce power loss caused by stirring of stored oil by the power transmission mechanism.

More preferably, the second reservoir portion is disposed substantially at a center in a longitudinal direction of a vehicle. The suction port of the hydraulic pump is fluid-connected to the second reservoir portion.

With this structure, it is further possible to effectively prevent cavitation due to drawing in of air by the hydraulic pump even when the vehicle is inclined in traveling on slopes and the like.

According to the present invention, there is further provided an oil supply unit that includes a hydraulic pump operatively connected to an engine.

The hydraulic pump is formed to be able to supply hydraulic fluid and/or lubricating oil to a power transmission portion of a power transmission mechanism constructed to output a driving force from the engine through the power transmission portion. The hydraulic pump is also formed to be of a variable displacement type in which a discharge quantity against a suction quantity is variable based on operation of an output adjusting member, and the discharge quantity against the suction quantity is varied based on a driven state of the engine.

With this structure, it is possible to effectively prevent the hydraulic pump from discharging an unnecessary surplus quantity of oil to thereby reduce power loss.

For example, the oil supply unit may further includes a detecting mechanism for directly or indirectly detecting an engine speed; and a control mechanism for operating the output adjusting member based on a detection result of the detecting mechanism.

The control mechanism is formed to position the output adjusting member in a predetermined slanting position when the engine at idle and to slant the output adjusting member from the predetermined slanting position toward a neutral position according to an increase in the engine speed when the engine is rotated at a speed exceeding an idle speed.

Alternatively, the oil supply unit may further includes a detecting mechanism for directly or indirectly detecting a load on an engine and a control mechanism for operating the output adjusting member based on a detection result of the detecting mechanism. The control mechanism is formed to position the output adjusting member in a predetermined slanting position when the load on the engine is equal to or less than a predetermined value and to slant the output adjusting member from the predetermined slanting position toward a maximum slanting position according to an increase in the load when the load on the engine exceeds the predetermined value.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENTS

Embodiment 1

Figure 1:
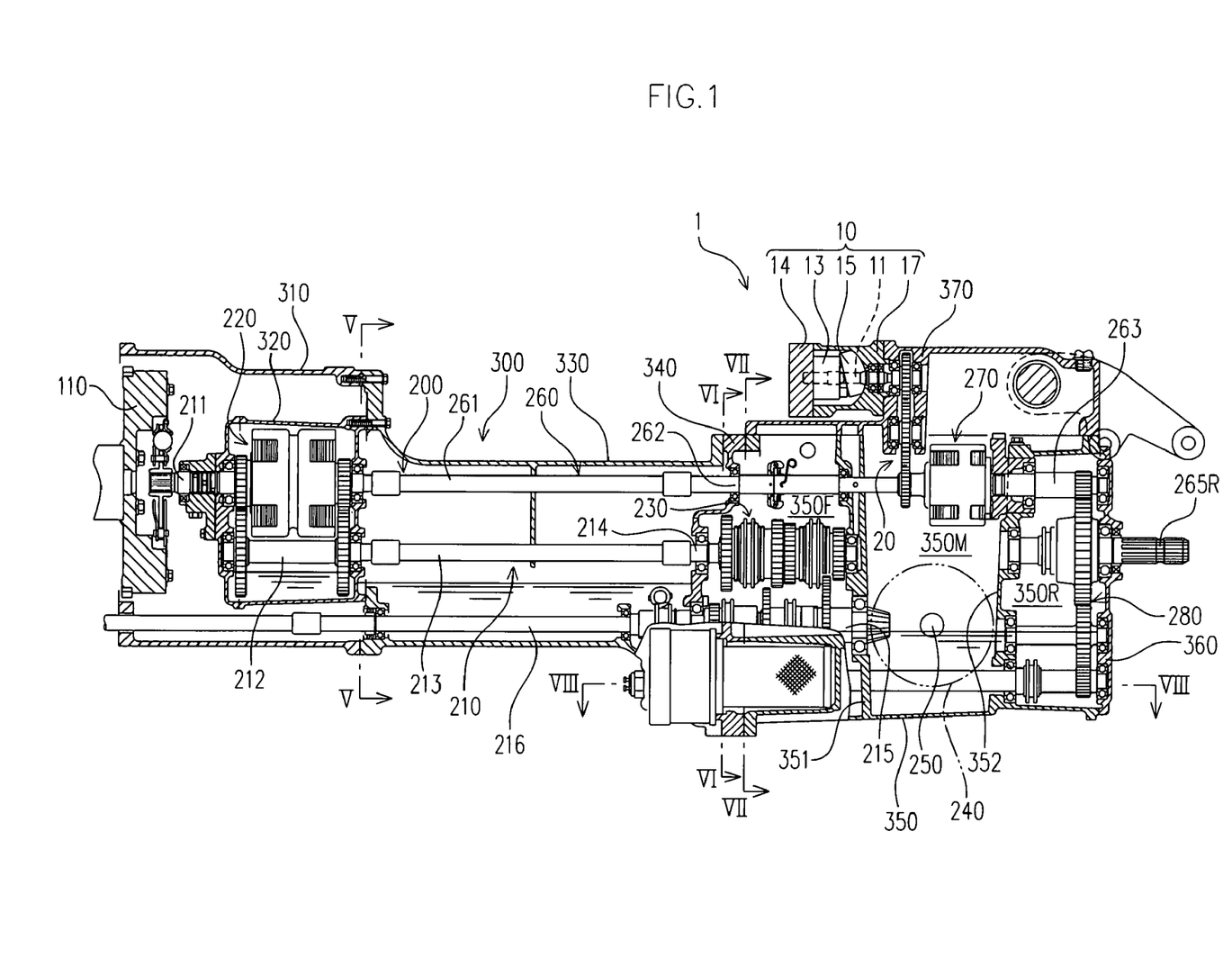
FIG. 1 is a vertical sectional view of a transmission to which an oil supply unit according to the present embodiment is applied.
Figure 2:
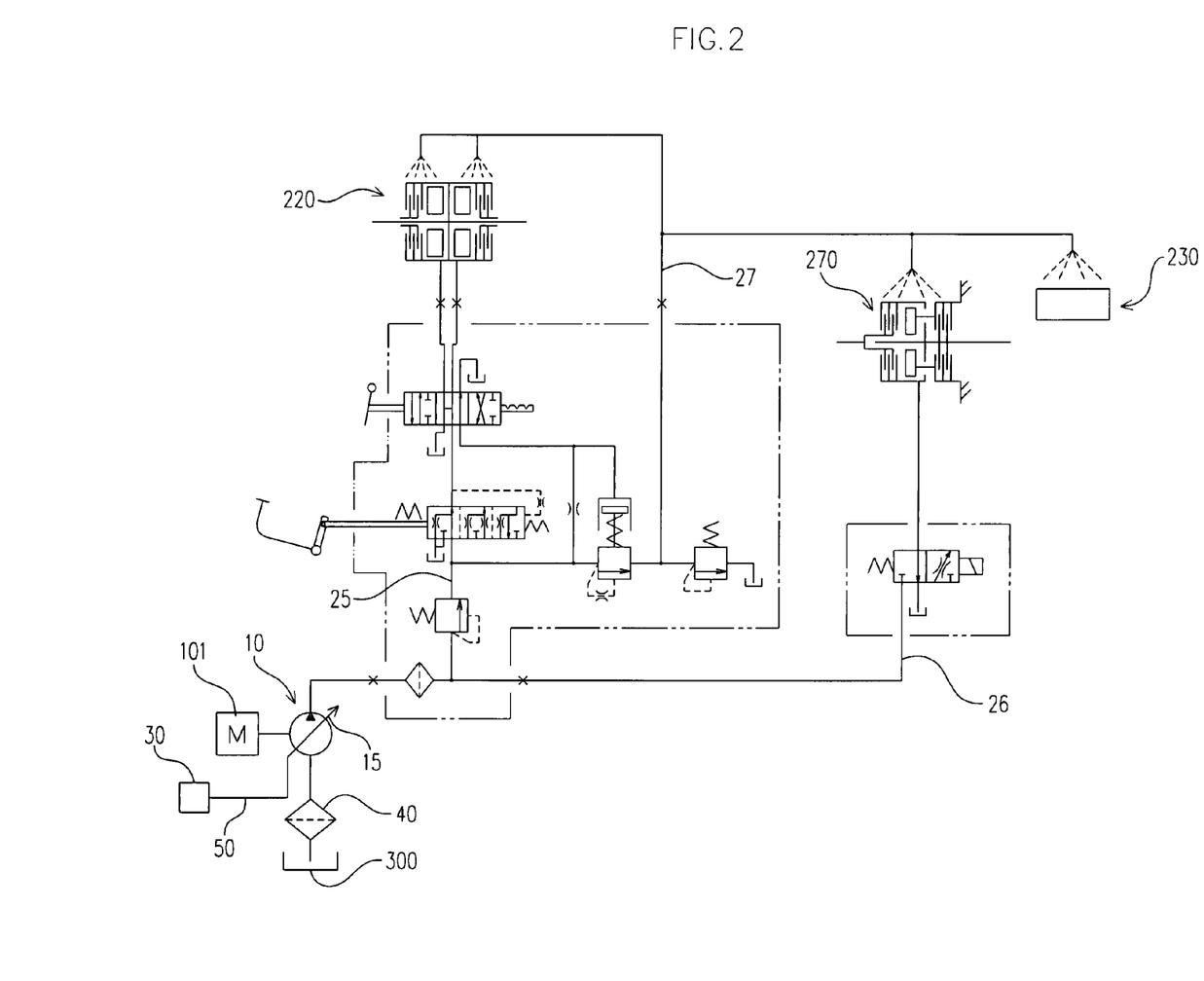
FIG. 2 is an oil hydraulic circuit diagram of the oil supply unit shown in FIG. 1.

A preferred embodiment of the invention will be described below with reference to the accompanying drawings. FIG. 1 is a vertical sectional view of a transmission 100 to which an oil supply unit 1 according to the present embodiment is applied. FIG. 2 is an oil hydraulic circuit diagram of the oil supply unit.

First, the transmission 100 will be described.

The transmission 100 includes a power transmission mechanism 200 for transmitting a driving force from an engine 101 (see FIG. 2), and a housing 300 for housing the power transmission mechanism 200.

The power transmission mechanism 200 includes a power transmission portion having a drive-side member operatively connected to the engine 101 and a driven-side member selectively engaged with the drive-side member, and an output portion operatively connected to the driven-side member of the power transmission portion.

In this embodiment, the power transmission mechanism 200 includes a traveling power transmission mechanism 210 for transmitting the driving force from the engine to main drive axles, and a PTO power transmission mechanism 260 for outputting the driving force from the engine toward an external device such as a work machine.

In this embodiment, the traveling power transmission mechanism 210 includes a drive shaft 211 operatively connected to the engine through a flywheel 110, a traveling shaft 212 disposed in parallel with the drive shaft 211, a forward/reverse switching device 220 for switching a power transmission direction from the drive shaft 211 to the traveling shaft 212, a traveling power transmission shaft 213 coupled to the traveling shaft 212 so as not to be rotatable with respect to the traveling shaft 212 about an axis, a traveling drive shaft 214 coupled to the traveling power transmission shaft 213 so as not to be rotatable with respect to the traveling power transmission shaft 213 about the axis, a traveling driven shaft 215 disposed in parallel with the traveling drive shaft 214, a mechanical transmission 230 for changing a speed of and transmitting power from the traveling drive shaft 214 to the traveling driven shaft 215, a pair of main drive axles 250 (a pair of rear axles in this embodiment), and a differential gear 240 for differential transmission from the traveling driven shaft 215 to the pair of main drive axles 250.

On the other hand, the PTO power transmission mechanism 260 includes the drive shaft 211, a PTO power transmission shaft 261 coupled to the drive shaft 211 so as not to be rotatable with respect to the drive shaft 211 about an axis, a PTO drive shaft 262 coupled to the PTO power transmission shaft 261 so as not to be rotatable with respect to the PTO power transmission shaft 261, a PTO driven shaft 263 disposed so as to be rotatable with respect to the PTO drive shaft 262, a PTO clutch 270 for selectively transmitting power from the PTO drive shaft 262 to the PTO driven shaft 263, a PTO gear unit 280 operatively connected to the PTO driven shaft 263, and a PTO shaft 265 which is coupled to the PTO gear unit 280 and from which power can be taken out from outside.

In this embodiment, the PTO shaft 265 includes a rear PTO shaft 265R and a middle PTO shaft 265M (see FIG. 8 which will be described later).

In the power transmission mechanism 200 having the above structure, the forward/reverse switching device 220, the mechanical transmission 230, and the PTO clutch 270 form the power transmission portion, and the main drive axles 250 and the PTO shaft 265 form the output portion.

The housing 300 houses the power transmission mechanism and is formed so that at least a part of an inside space of the housing 300 is used as the oil source of the oil supply unit 1.

In this embodiment, the housing 300 has a front housing 310, a middle housing 330 and a rear housing 350 coupled to each other in series along a longitudinal direction of a vehicle.

The front housing 310 is in a hollow shape open at its longitudinal opposite end portions and is formed to house the flywheel 110 and the forward/reverse switching device 220.

Specifically, the housing 300 further has a reverser case 320 housing the forward/reverse switching device 220 and coupled to a front end face of the middle housing 330 so as to be positioned in the front housing 310.

The middle housing 330 is similarly in a hollow shape open at its longitudinal opposite end portions and is coupled to the front housing 310 with opposed end faces of the front and middle housings 310 and 330 in contact with each other.

Into the middle housing 330, the traveling power transmission shaft 213 and the PTO power transmission shaft 261 are inserted. In other words, the power transmission portion of the power transmission mechanism 200 is not positioned in the middle housing 330.

The rear housing 350 is open on its front, upper and rear sides.

The rear housing 350 is coupled to the middle housing 330 with a support plate 340 sandwiched therebetween.

The rear opening and the upper opening of the rear housing 350 are respectively closed with a rear plate 360 and an upper plate 370.

Specifically, an inside space of the rear housing 350 is partitioned into a front chamber 350F, a middle chamber 350M and a rear chamber 350R along a back and forth direction of the vehicle with integrally formed first and second partitions 351 and 352.

The mechanical transmission 230 is housed in the front chamber 350F, and the PTO clutch 270 and the differential gear 240 are housed in the middle chamber 350M. The PTO gear unit 280 is housed in the rear chamber 350R.

In the housing 300, in addition to the inside spaces of the middle housing 330 and the rear housing 350, an inside space of the reverser case 320 is an oil reservoir space in which oil can be stored, and an inside space of the front housing 310 excluding the reverser case 320 is a dry chamber.

In the figure, a reference numeral 216 denotes a four-wheel drive power transmission shaft for transmitting the driving force to axles (front axles in this embodiment) other than the main drive axles 250 (rear axles in this embodiment) in synchronization with the main drive axles.

Next, the oil supply unit 1 according to this embodiment will be described.

The oil supply unit 1 has a hydraulic pump 10 of a variable displacement type.

The hydraulic pump 10 has an output adjusting member 15, and a discharge quantity is changed by operating the output adjusting member 15 based on outside operation.

The hydraulic pump 10 is always and operatively connected to the engine and is formed so that the rotation number of a pump shaft 11 increases and reduces according to the engine speed.

Figure 3:
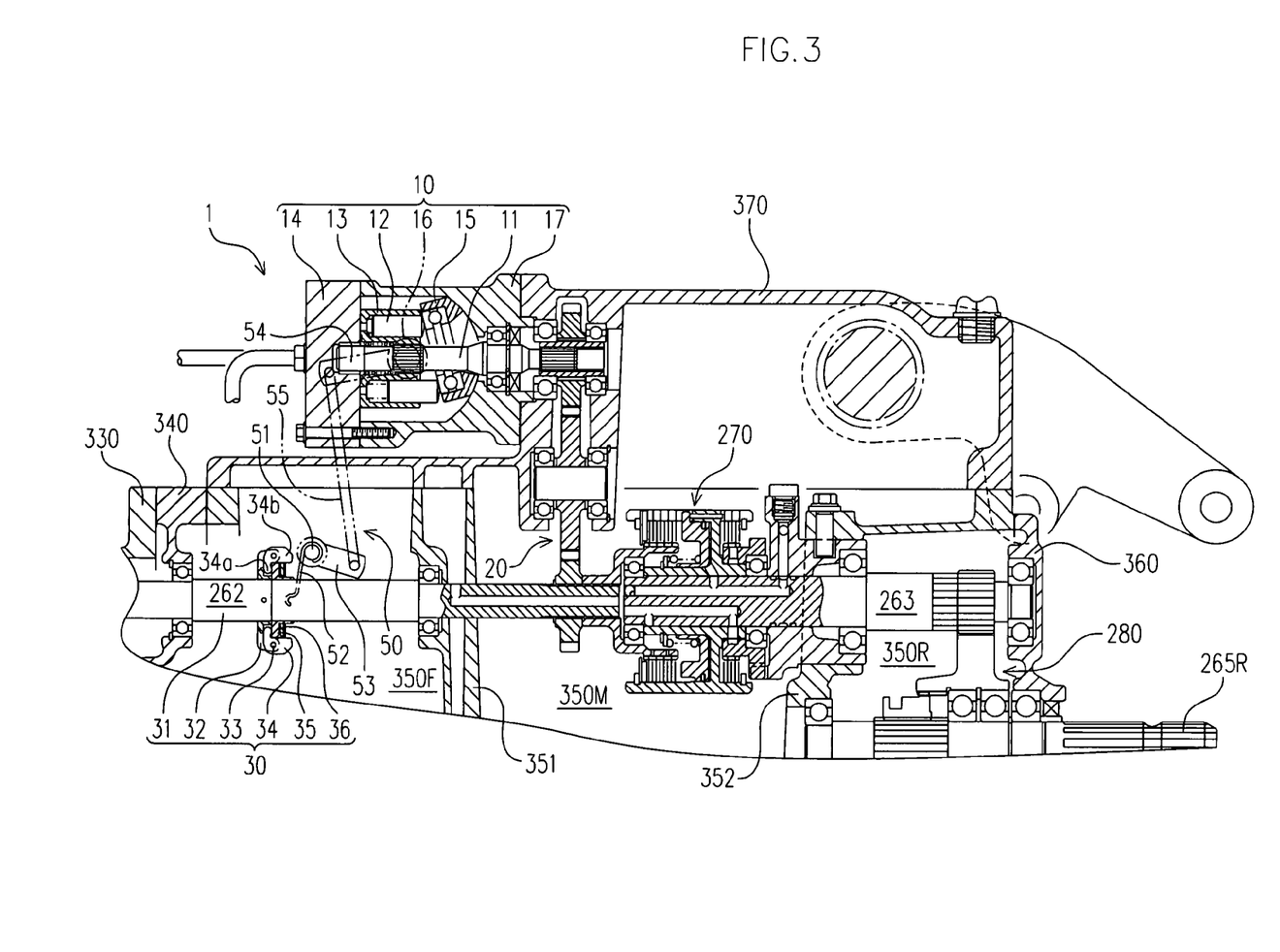
FIG. 3 is a vertical sectional side view of a vicinity of a hydraulic pump of the oil supply unit.

FIG. 3 is a vertical sectional side view of a vicinity of the hydraulic pump 10.

More specifically, the hydraulic pump 10 includes the pump shaft 11 interlocked with and coupled to the engine, a piston unit 12 for rotating about an axis of the pump shaft 11 as the pump shaft 11 rotates and, also, for reciprocating in synchronization with the rotation, a cylinder block 13 for supporting the piston unit 12 in a reciprocatable manner, a plate 14 for supporting the cylinder block 13 in a rotatable manner, an output adjusting member 15 for determining a stroke length of the piston unit 12 by a slanting position to change drawn/discharged oil quantities by the piston unit 12, a control shaft 16 for regulating the slanting position of the output adjusting member 15, and a pump case 17 coupled to the plate 14 so as to surround the piston unit 12, the cylinder block 13 and the output adjusting member 15, as shown in FIG. 3.

In this embodiment, the hydraulic pump 10 is disposed at the upper plate 370 and the driving force of the engine is transmitted from the PTO drive shaft 262 to the pump shaft 11 through a proper gear train 20.

A suction port of the hydraulic pump 10 with the above structure is fluid-connected to the oil source, and a discharge port is fluid-connected to the power transmission portion in the power transmission mechanism 200 (see FIG. 2).

In other words, the oil supply unit 1 according to this embodiment is formed to draw oil from the suction port of the hydraulic pump 10 fluid-connected to the oil source and to supply the drawn oil from the discharge port to the power transmission portion through a proper oil path.

Specifically, as shown in FIG. 2, the suction port is fluid-connected to the housing 300, which is also used as the oil source in this embodiment.

The discharge port of the hydraulic pump 10 is fluid-connected to a reverser hydraulic fluid supply line 25 for supplying hydraulic fluid to the forward/reverse switching device 220, a PTO clutch hydraulic fluid supply line 26 for supplying hydraulic fluid to the PTO clutch 270, and a lubricating oil line 27 for respectively supplying lubricating oil to the forward/reverse switching device 220, the PTO clutch 270 and the mechanical transmission 230.

A rate of the discharged oil quantity to the drawn (or suction) oil quantity of the hydraulic pump 10 changes based on an engine driven state.

Concretely, the oil supply unit 1 includes a detecting mechanism 30 for monitoring the driven state of the engine, and a control mechanism 50 for operating the output adjusting member 15 based on a result of monitoring by the detecting mechanism 30.

As shown in FIG. 3, in this embodiment, the detecting mechanism 30 includes a reference shaft 31 always and operatively connected to the engine, a base member 32 supported on the reference shaft 31 so as not to be rotatable with respect to the reference shaft 31 and so as not to be able to slide in an axial direction, weight members 34 each supported by the base member 32 so as to be able to swing about a pivot shaft 33 orthogonal to the reference shaft 31 and so as to be able to swing about the pivot shaft 33 according to a centrifugal force due to the axial rotation of the reference shaft 31, a slider member 35 supported on the reference shaft 31 so as to be able to swing and so as to be pushed in the axial direction of the reference shaft 31 from an initial position by the weight members 34 each swinging about the pivot shaft 33, and a biasing member 36 for biasing the slider member 35 toward the initial position.

As shown in FIG. 3, in this embodiment, the reference shaft 31 is the PTO drive shaft 262.

As the reference shaft 31, various shafts can be used as long as they rotate according to the engine speed.

Each of the weight members 34 is in an L shape in a vertical sectional side view, the shape having a contact portion 34*a* extending radially inward from the pivot shaft 33 with respect to the axis (reference axis) of the reference shaft 31 and a weight portion 34*b* positioned radially outside the contact portion 34*a* with respect to the reference axis.

When the weight member 34 rotates about the reference axis as the reference shaft 31 rotates, the weight portion 34*b* swings due to the centrifugal force about the pivot shaft 33 so as to move radially outward and, as a result, the contact portion 34*a* pushes the slider member 35.

The control mechanism 50 includes a pivot shaft 51 disposed to be orthogonal to the reference axis, a pushing arm 52 having a base end portion not rotatable with respect to the pivot shaft 51 and a free end portion engaged with the slider member 35, a coupling arm 53 having a base end portion not rotatable with respect to the pivot shaft 51, an operating arm 54 having a base end portion not rotatable with respect to the control shaft 16, and a connecting rod 55 for interlocking and linking the free end portion of the coupling arm 53 and a free end portion of the operating arm 54 with and to each other.

The control mechanism 50 is formed to position the output adjusting member 15 in an initial slanting position (e.g., maximum slanting position) when the engine is at idle and to cause the output adjusting member 15 to approach a neutral position from the initial slanting position as the engine speed increases.

With the oil supply unit 1 having the above structure, the following effects can be obtained.

Figure 4:
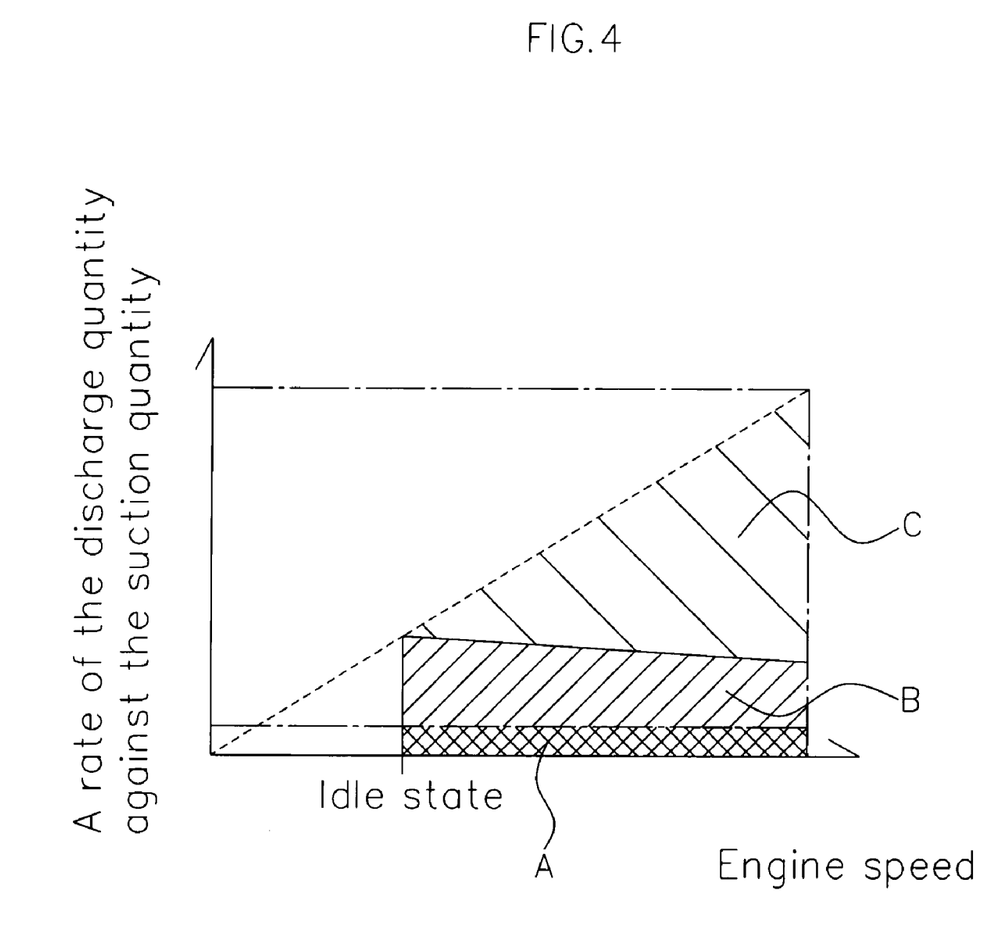
FIG. 4 is a diagram showing a relationship between an engine speed and a discharge quantity against a suction quantity of the hydraulic pump.

FIG. 4 shows a relationship between the engine speed and the discharge quantity of the hydraulic pump. In FIG. 4, portions A, B and C respectively denote an oil quantity to be used as the hydraulic fluid for the power transmission portion, an oil quantity to be used as the lubricating oil for the members to be lubricated and a surplus oil quantity.

In the conventional structure in which the hydraulic pump is of the fixed displacement type and the rotation number of the pump shaft of the pump of the fixed displacement type increases and reduces merely in proportion to the engine speed, the surplus discharge quantity (the portion C in FIG. 4) increases as the engine speed increases.

On the other hand, in the oil supply unit 1 according to this embodiment, the output adjusting member 15 is set to be able to obtain the necessary discharged oil quantity (the portion A+the portion B in FIG. 4) when the engine is at idle, and the output adjusting member 15 is moved to the neutral position when the engine speed exceeds an idle speed as described above.

Therefore, the discharge quantity of the hydraulic pump 10 can approach the necessary oil quantity irrespective of the engine speed and the surplus discharge quantity (the portion C in FIG. 4) can be reduced or eliminated, to thereby reduce horsepower loss.

Further, the following structure is employed in the oil supply unit 1 according to this embodiment so as to reduce stirring loss caused by the power transmission mechanism and to effectively prevent running out of oil of the oil source of the hydraulic pump.

In other words, as described above, the housing 300 for housing the power transmission mechanism 200 is used as the oil source of the hydraulic pump 10 in this embodiment.

In this form, if an amount of oil stored in the housing 300 is increased, the stirring resistance to the power transmission mechanism 200 increases. On the other hand, if the amount of oil stored in the housing 300 is reduced, the oil for the hydraulic pump 10 may run out.

In this respect, in this embodiment, the oil reservoir space in the housing 300 is divided into a first reservoir portion in which the power transmission portion is housed and a second reservoir portion in which the power transmission portion is not housed, and oil is sent from the first reservoir portion to the second reservoir portion by utilizing rotational motion of the power transmission mechanism 200.

Specifically, in the housing 300, an inside space of the reverser case 320 positioned in the front housing 310 is used as the oil reservoir space in addition to the inside space of the middle housing 330 and the inside space of the rear housing 350.

The forward/reverse switching device 220 forming the power transmission portion is housed in the reverser case 320, the mechanical transmission 230 forming the power transmission portion is housed in the rear housing 350, and the middle housing 330 in which the power transmission portion is not housed is positioned in the center between the reverser case 320 and the rear housing 350 in the longitudinal direction of the vehicle.

The housing is formed so that the stored oil in the reverser case 320 and the stored oil in the rear housing 350 are respectively sent to the middle housing 330 by utilizing the rotational motion of the forward/reverse switching device 220 and the mechanical transmission 230.

In other words, in this embodiment, the reverser case 320 and the rear housing 350 form the first reservoir portion of the oil reservoir space, and the middle housing 330 forms the second reservoir portion.

Concretely, the oil is sent from the first reservoir portion to the second reservoir portion by the following structure.

Figure 5:
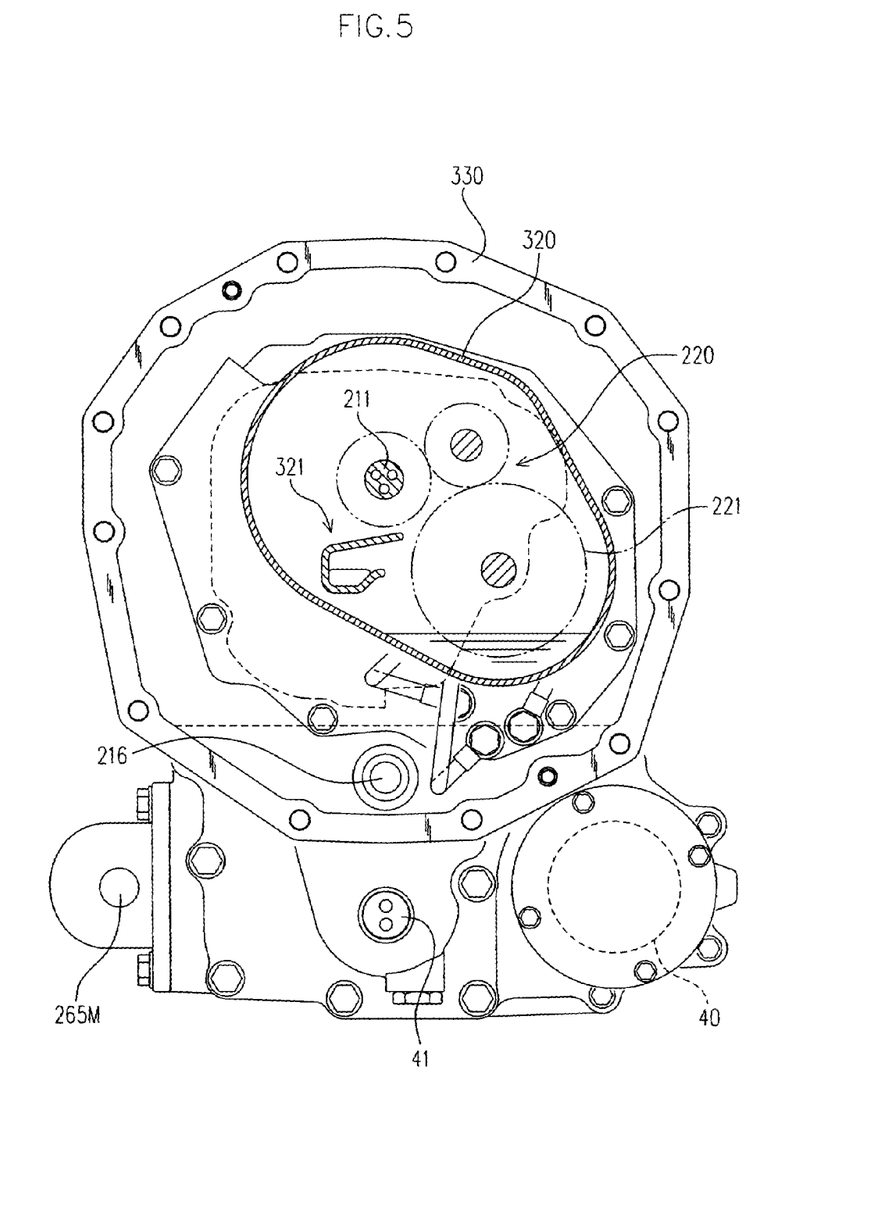
FIG. 5 is a sectional view taken along line V—V in FIG. 1.
Figure 6:
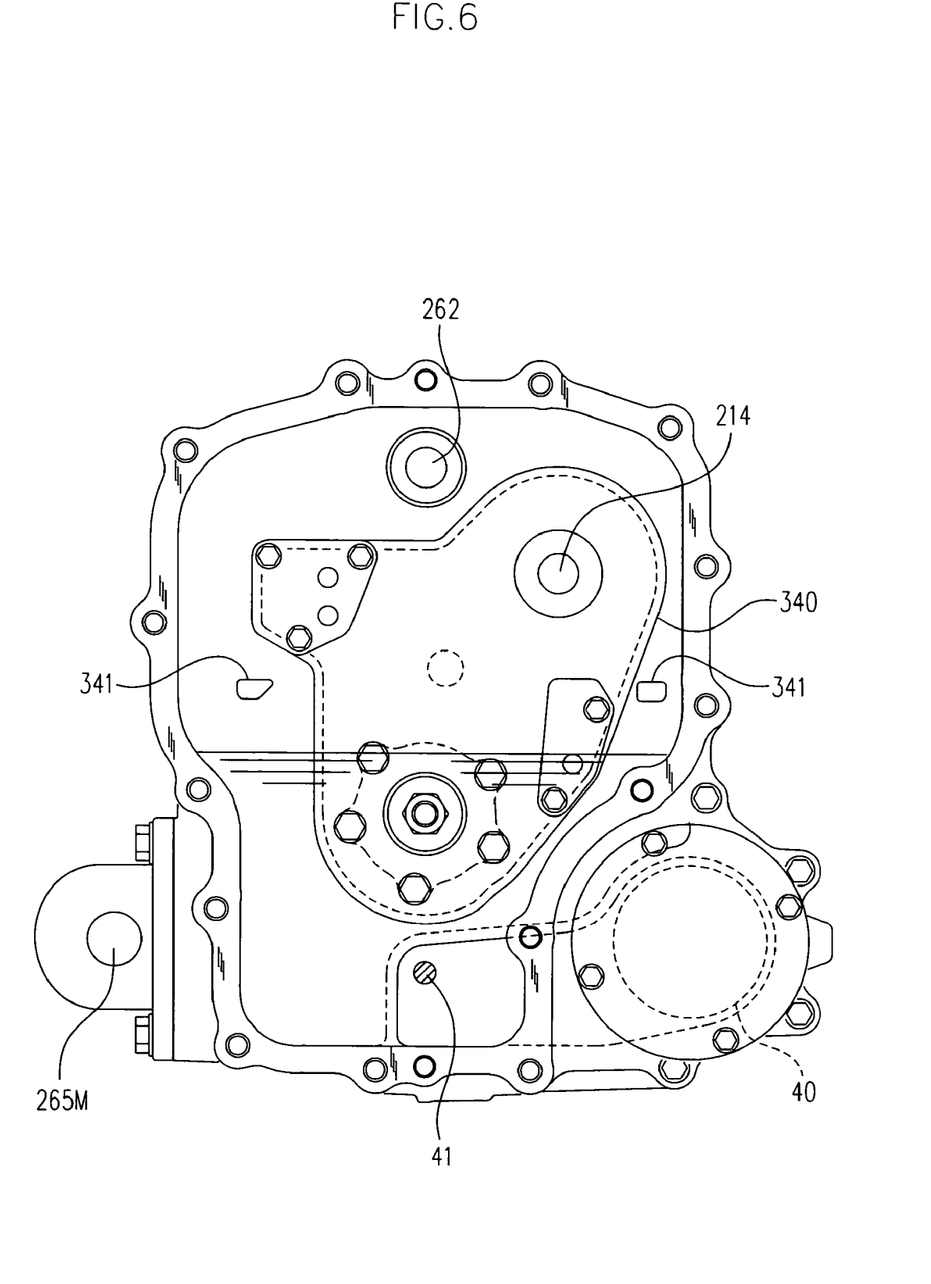
FIG. 6 is a sectional view taken along line VI—VI in FIG. 1.
Figure 7:
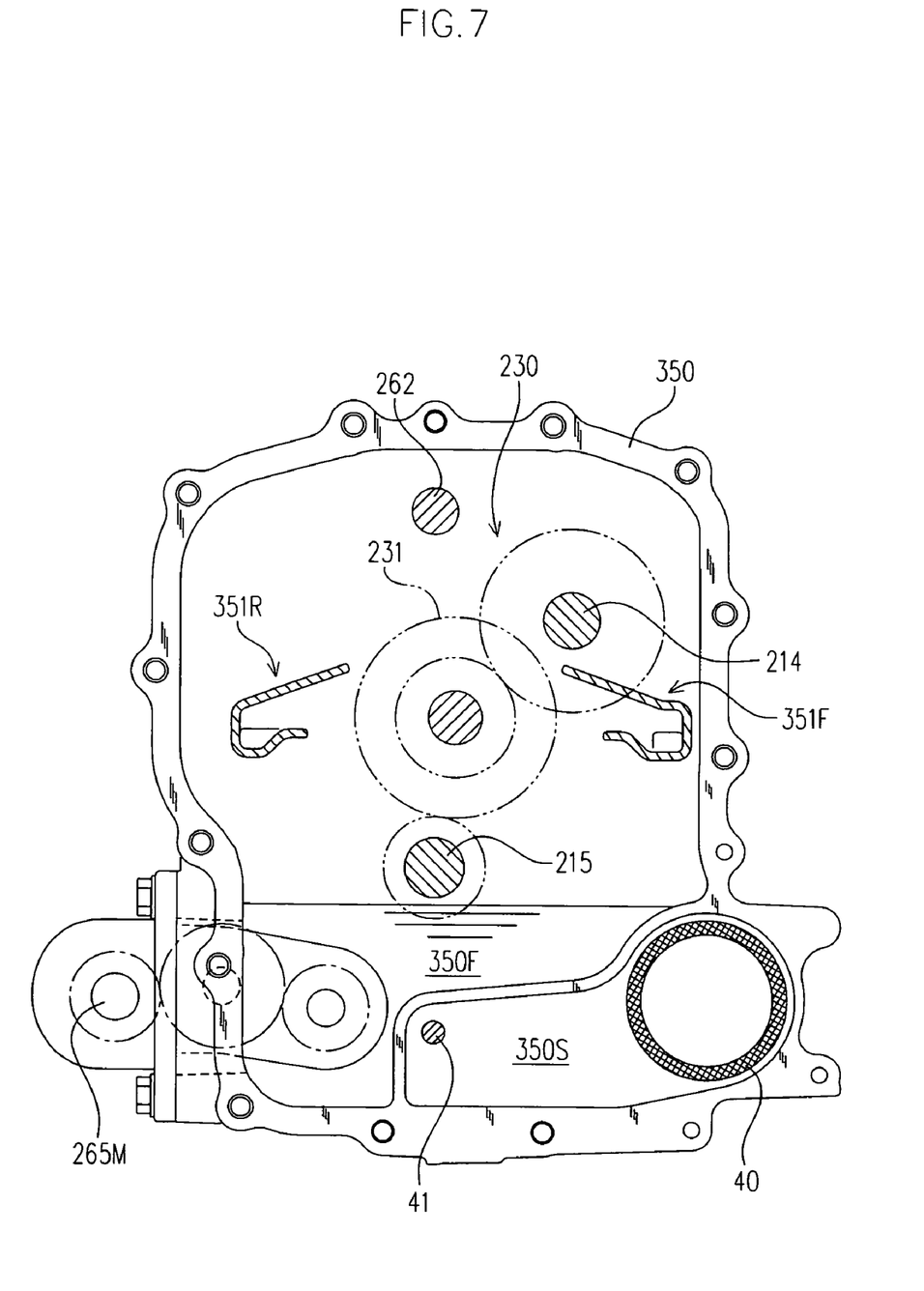
FIG. 7 is a sectional view taken along line VII—VII in FIG. 1.

FIGS. 5 to 7 are respectively sectional views taken along lines V—V, VI—VI and VII—VII in FIG. 1.

As shown in FIG. 5, the reverser case 320 has a conduit member 321 for receiving oil raked up by a rotor 221 in the forward/reverse switching device 220 and guiding the received oil into the middle housing 330.

Similarly, as shown in FIG. 7, the rear housing 350 has conduit members 351 for receiving oil raked up by a rotor 231 in the mechanical transmission 230 and guiding the received oil into the middle housing 330.

The support plate 340 is provided with holes 341 for allowing oil to flow from the conduit members 351 into the middle housing 330 (see FIG. 6).

The conduit members 351 provided to the rear housing 350 has a forward conduit member 351F for receiving the oil raked up when the rotor 231 rotates in a forward direction and a rear conduit member 351R for receiving oil raked up when the rotor 231 rotates in a reverse direction.

Moreover, in the oil supply unit 1 according to this embodiment, the hydraulic pump 10 is formed to draw oil from the second reservoir portion.

Figure 8:
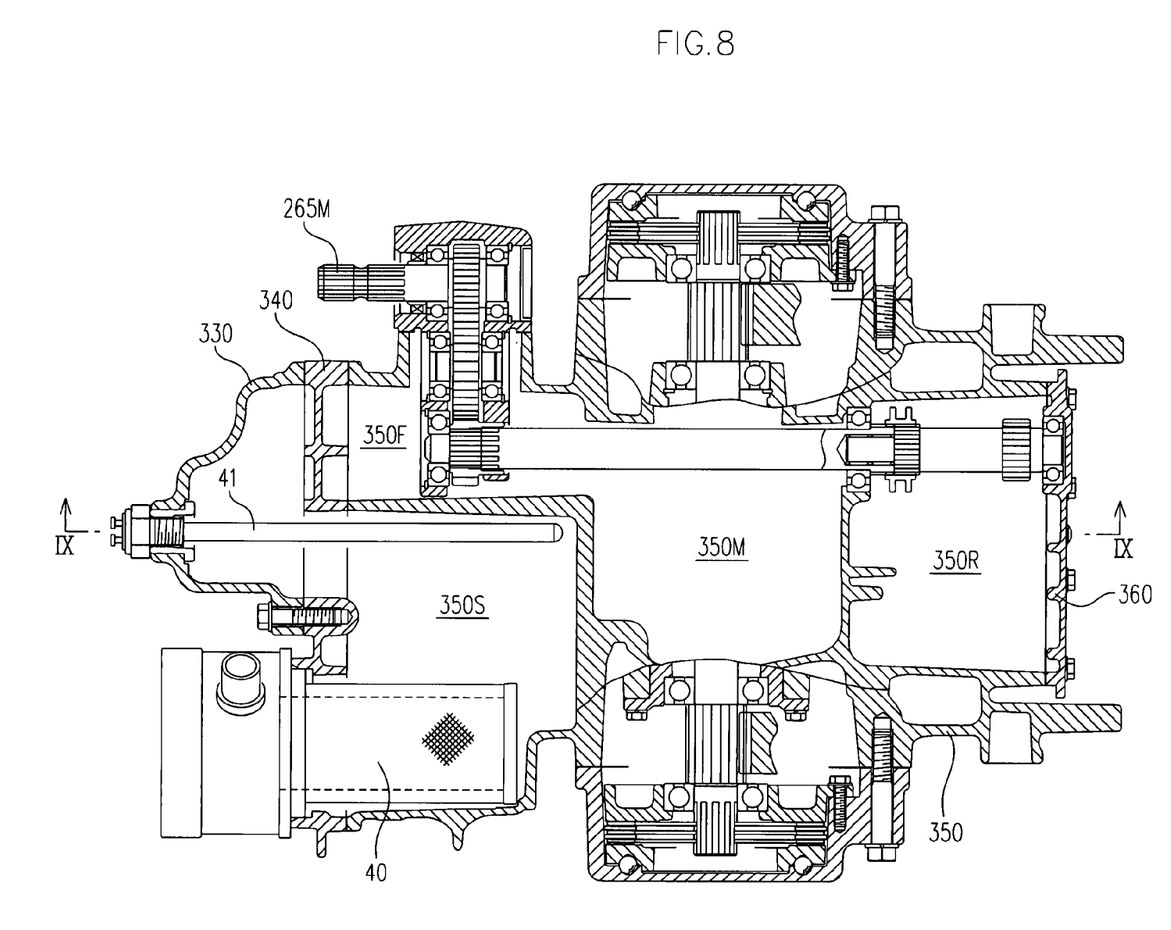
FIG. 8 is a sectional view taken along line VIII—VIII in FIG. 1.
Figure 9:
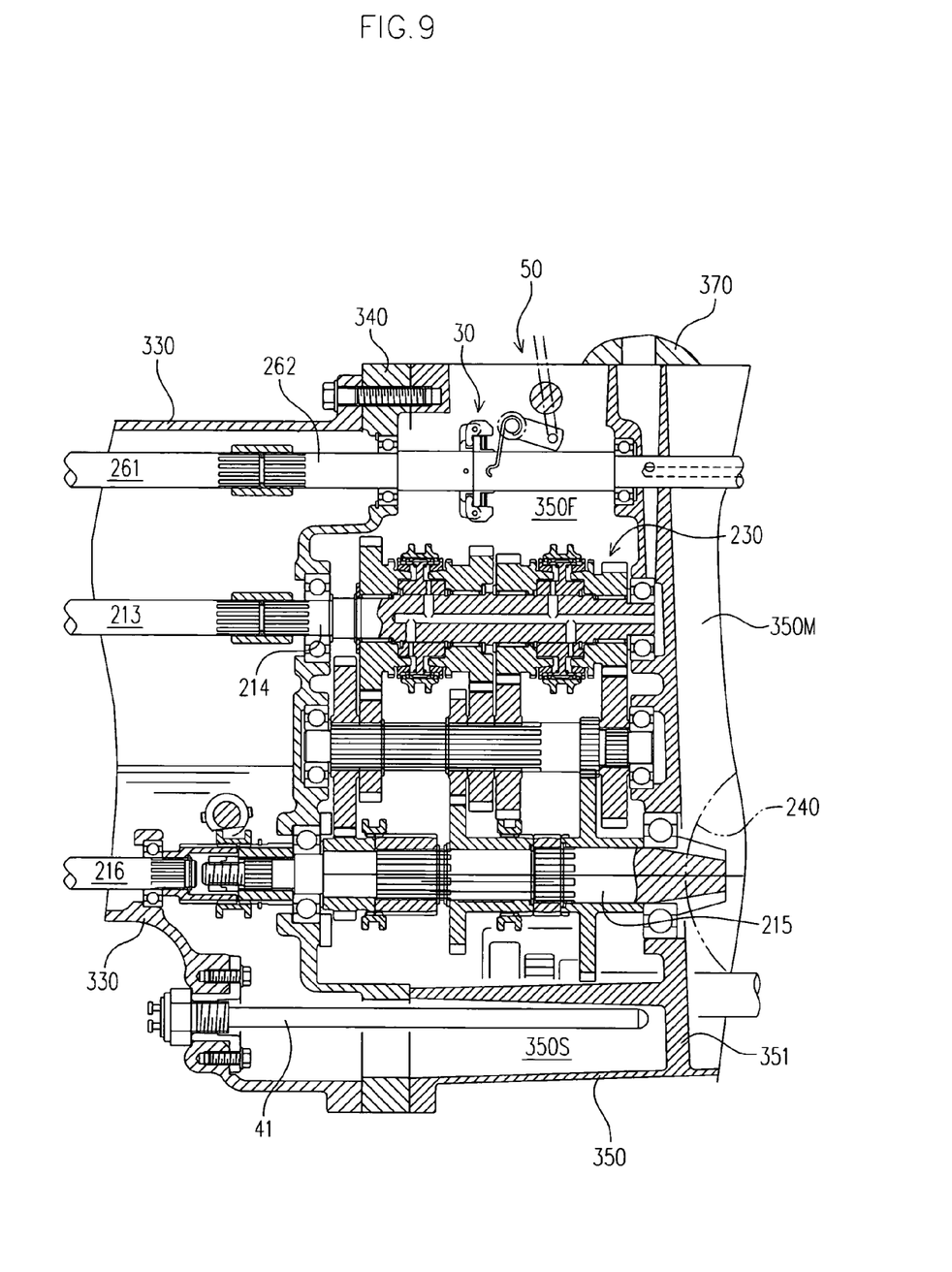
FIG. 9 is a sectional view taken along line IX—IX in FIG. 8.

FIG. 8 is a sectional view taken along line VIII—VIII in FIG. 1. FIG. 9 is a sectional view taken along line IX—IX in FIG. 8.

As shown in FIGS. 8 and 9, the rear housing 350 has an oil taking-out space 350S below the front chamber 350F, the space 350S communicating with the inside space of the middle housing 330 and being separated from the other portion of the rear housing 350 in a liquid-tight manner.

In this embodiment, the hydraulic pump 10 is formed to draw oil from the oil taking-out space 350S through a line filter 40.

A reference numeral 41 in FIGS. 8 and 9 denotes an oil heater for heating the stored oil drawn through the line filter 40 to a proper temperature.

As described above, in this embodiment, the oil reservoir space in the housing 300 is divided into the first reservoir portion in which the power transmission portion in the power transmission mechanism is housed and the second reservoir portion in which the power transmission portion is not housed, the oil is sent from the first reservoir portion to the second reservoir portion, and the oil is drawn from the second reservoir portion.

As a result, while effectively preventing power loss due to stirring loss of the power transmission mechanism, running out of the oil is prevented.

Further, in this embodiment, the middle housing 330 positioned substantially at a center in the longitudinal direction of the vehicle forms the second reservoir portion.

In this form, it is possible to suppress variation in an oil level in the second reservoir portion when the vehicle travels on slopes such as upward and downward slopes.

Therefore, it is possible to effectively prevent cavitation due to drawing in of air by the hydraulic pump 10 during traveling on the slope.

Embodiment 2

Another preferred embodiment of the invention will be described below with reference to the accompanying drawings.

Figure 10:
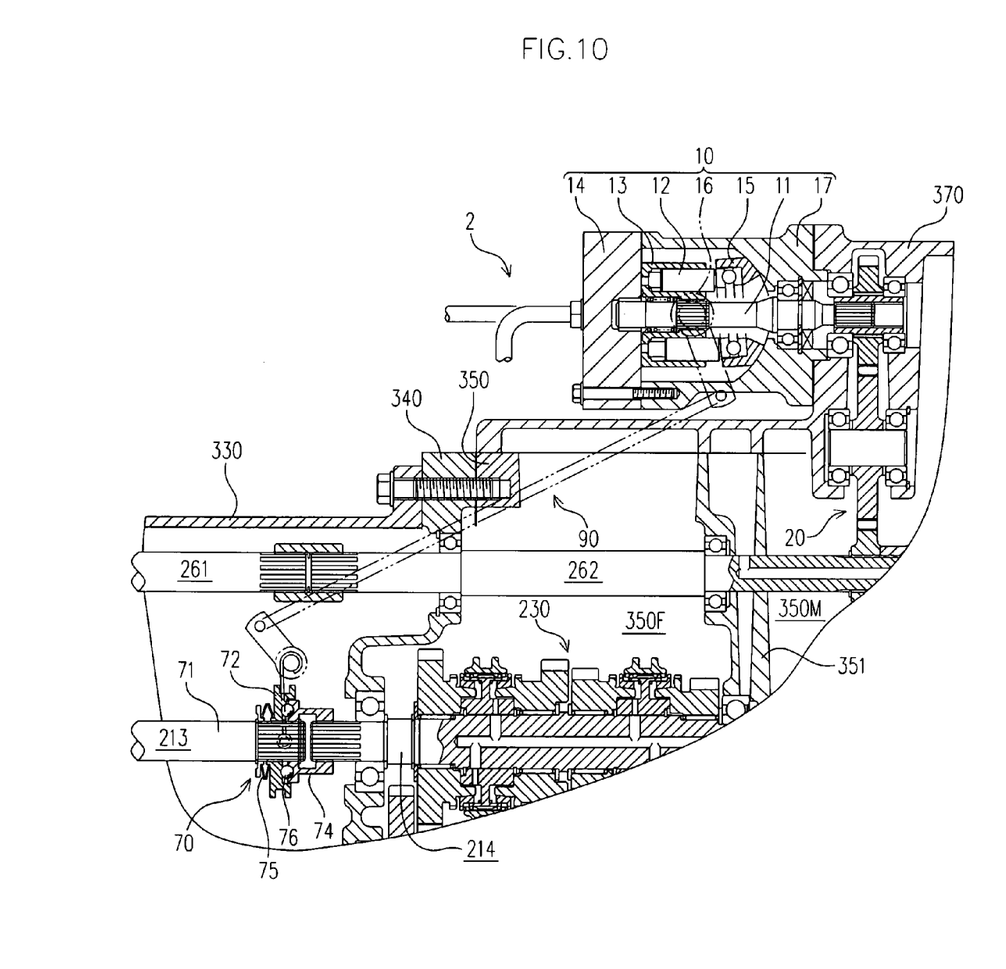
FIG. 10 is a vertical sectional side view of an oil supply unit according to another embodiment of the present invention.

FIG. 10 is a vertical sectional side view of an oil supply unit 2 according to this embodiment.

Members similar or corresponding to those in the first embodiment will be denoted by the same reference numerals; therefore, detailed description thereof will not be made herein.

Although the oil supply unit 1 according to the first embodiment is formed so that the output adjusting member 15 of the hydraulic pump 10 is operated according to the engine speed, the oil supply unit 2 according to this embodiment is formed so that the output adjusting member 15 of the hydraulic pump 10 is operated according to a load on the engine.

In other words, the oil supply unit 2 according to this embodiment has substantially the same structure as that in the first embodiment except that it has a detecting mechanism 70 and a control mechanism 90 respectively instead of the detecting mechanism 30 ad the control mechanism 50.

First, the detecting mechanism 70 will be described.

The detecting mechanism 70 is formed to monitor the load on the engine between a drive-side member operatively connected to the engine and a driven-side member operatively connected to the output portion to receive power transmission from the drive-side member.

Concretely, the detecting mechanism 70 includes a slider member 72 supported on a drive-side reference shaft 71 (traveling power transmission shaft 213 in the embodiment shown in the figure) so as not to be rotatable with respect to the drive-side reference shaft 71 and to be able to slide in an axial direction, the drive-side reference shaft 71 being operatively connected to the engine, a coupling member 74 which couples the drive-side reference shaft 71 to a driven-side reference shaft 73 (traveling drive shaft 214 in the form shown in the figure) "forming a power transmission path together with the drive-side reference shaft 71" so that the shaft 71 cannot axially rotate with respect to the shaft 73 and which cannot axially slide with respect to both the shafts 71 and 73, and a biasing member 75 for biasing the slider member 72 toward the coupling member 74.

The slider member 72 is formed at its end face opposed to the coupling member 74 with a cam groove (not shown) extending in a circumferential direction with respect to the axis of the drive-side reference shaft 71. The cam groove includes a deepest portion having the largest depth and slanting portions between which the deepest portion is sandwiched and which have depths reducing toward opposite sides in the circumferential direction.

The coupling member 74 has a projection to be engaged in the cam groove on an end face of the coupling member 74 facing the slider member 72.

In this embodiment, the coupling member 74 has a ball locking hole in the end face of the coupling member 74 facing the slider member 72, and balls 76 are retained in a rollable manner in the ball locking hole. The balls 76 form the projection to be engaged in the cam groove.

The detecting mechanism 70 having the above structure operates as follows.

When the load applied on the output portion (main drive axles 250 in this embodiment) is small, the slider member 72 and the coupling member 74 rotate together in a state where the balls 76 are engaged in the deepest portion of the cam groove. Therefore, the slider member 72 is kept retained in an initial position by the biasing member 75.

On the other hand, when the large load is applied on the output portion, the balls 76 mount the slanting portions from the deepest portion due to the large load. As a result, the slide member 72 is pushed in such a direction as to move away from the coupling member 74 against a biasing force of the biasing member 75.

As described above, in the detecting mechanism 70, the slider member 72 is positioned in the initial position when the load applied on the output portion is equal to or less than a predetermined value, and the slider member 72 is pushed in the axial direction by a distance corresponding to the load when the load applied on the output portion has exceeded the predetermined value.

Next, the control mechanism 90 will be described.

The control mechanism 90 is formed to increase the discharge quantity of the hydraulic pump 10 according to an increase in the load when the load applied on the output portion has exceeded the predetermined value.

In other words, the control mechanism 90 positions the output adjusting member 15 of the hydraulic pump 10 in a predetermined initial slanting position when the slider member 72 is positioned in the initial position. When the slider member 72 has been pushed from the initial position, the control mechanism 90 moves the output adjusting member 15 of the hydraulic pump 10 from the initial slanting position toward a maximum slanting position according to a distance by which the slider member 72 has been pushed.

In the oil supply unit 2 having the above structure, the oil quantity supplied from the hydraulic pump 10 to the power transmission portion can be made a minimum necessary quantity when the load applied on the output portion is small, and the oil quantity supplied to the power transmission portion can be increased when the load applied on the output portion has become large.

In other words, the required quantity of oil can efficiently be supplied when necessary to thereby reduce the power loss.

Although mechanical detecting mechanisms are employed as the detecting mechanisms 30 and 70 in the first and second embodiments, it is needless to say that various detecting mechanisms such as electric mechanisms may be employed.

This specification is by no means intended to restrict the present invention to the preferred embodiments set forth therein. Various modifications to the oil supply unit may be made by those skilled in the art without departing from the spirit and scope of the present invention as defined in the appended claims.

The invention claimed is:

1. An oil supply unit for a running power transmission of a vehicle comprising:
   a housing for accommodating a power transmission mechanism which has a power transmission portion and an output portion and in which a driving force from the engine is transmitted to the output portion through the power transmission portion, at least a part of an inside space of the housing being an oil reservoir space;
   a hydraulic pump of a variable displacement type, operatively connected to the engine and including a suction port fluid-connected to the oil reservoir space, a discharge port fluid-connected to the power transmission portion and an output adjusting member, a discharge quantity against a suction quantity of the pump being variable based on operation of the output adjusting member;
   a detecting mechanism for monitoring a driven state of the engine; and
   a control mechanism for operating the output adjusting member to thereby regulate the discharge quantity against the suction quantity of the hydraulic pump of the variable displacement type based on the driven state of the engine.

2. An oil supply unit according to claim 1, in which
   the power transmission portion has a drive-side member positioned on the engine side and a driven-side member positioned on the output portion side,
   the detecting mechanism is formed to directly or indirectly detect an engine speed, and
   the control mechanism operates the output adjusting member so as to reduce the discharge quantity against the suction quantity of the hydraulic pump when the speed detected by the detecting mechanism exceeds a predetermined value.

3. An oil supply unit according to claim 2, in which
   the oil reservoir space is divided into a first reservoir portion in which the power transmission portion is accommodated and a second reservoir portion in which the power transmission portion is not accommodated, and
   the housing is formed to be able to send oil from the first reservoir portion to the second reservoir portion by utilizing rotational motion of the power transmission mechanism.

4. An oil supply unit according to claim 3, in which
   the second reservoir portion is disposed substantially at a center in a longitudinal direction of a vehicle, and
   the suction port of the hydraulic pump is fluid-connected to the second reservoir portion.

5. An oil supply unit according to claim 1, in which
   the detecting mechanism is formed to detect a load applied on the engine, and
   the control mechanism operates the output adjusting member so as to increase the discharge quantity against the suction quantity of the hydraulic pump when the load detected by the detecting mechanism exceeds a predetermined value.

6. An oil supply unit according to claim 5, in which
   the oil reservoir space is divided into a first reservoir portion in which the power transmission portion is accommodated and a second reservoir portion in which the power transmission portion is not accommodated, and
   the housing is formed to be able to send oil from the first reservoir portion to the second reservoir portion by utilizing rotational motion of the power transmission mechanism.

7. An oil supply unit according to claim 6, in which
   the second reservoir portion is disposed substantially at a center in a longitudinal direction of a vehicle, and
   the suction port of the hydraulic pump is fluid-connected to the second reservoir portion.

8. An oil supply unit according to claim 1, in which
   the oil reservoir space is divided into a first reservoir portion in which the power transmission portion is accommodated and a second reservoir portion in which the power transmission portion is not accommodated, and
   the housing is formed to be able to send oil from the first reservoir portion to the second reservoir portion by utilizing rotational motion of the power transmission mechanism.

9. An oil supply unit according to claim 8, in which
   the second reservoir portion is disposed substantially at a center in a longitudinal direction of a vehicle, and
   the suction port of the hydraulic pump is fluid-connected to the second reservoir portion.

10. An oil supply unit for a running power transmission of a vehicle comprising:
    a hydraulic pump operatively connected to an engine, in which
    the hydraulic pump is formed to be able to supply hydraulic fluid and/or lubricating oil to a power transmission portion of a power transmission mechanism constructed to output a driving force from the engine through the power transmission portion,
    the hydraulic pump is of a variable displacement type in which a discharge quantity against a suction quantity is variable based on operation of an output adjusting member, and the discharge quantity against the suction quantity is varied based on a driven state of the engine, and the output adjusting member is set to be able to obtain the necessary discharged oil quantity when the engine is at idle and is moved to a neutral position when the engine speed exceeds an idle speed.

11. An oil supply unit for a running power transmission of a vehicle comprising:
a hydraulic pump operatively connected to an engine, in which the hydraulic pump is formed to be able to supply hydraulic fluid and/or lubricating oil to a power transmission portion of a power transmission mechanism constructed to output a driving force from the engine through the power transmission portion, the hydraulic pump being of a variable displacement type in which a discharge quantity against a suction quantity is variable based on operation of an output adjusting member, and the discharge quantity against the suction quantity is varied based on a driven state of the engine,     a detecting mechanism for directly or indirectly detecting an engine speed; and     a control mechanism for operating the output adjusting member based on a detection result of the detecting mechanism, in which     the control mechanism is formed to position the output adjusting member in a predetermined slanting position when the engine is at idle and to slant the output adjusting member from the predetermined slanting position toward a neutral position according to an increase in the engine speed when the engine is rotated at a speed exceeding an idle speed.

12. An oil supply unit for a running power transmission of a vehicle comprising:

a hydraulic pump operatively connected to an engine, in which the hydraulic pump is formed to be able to supply hydraulic fluid and/or lubricating oil to a power transmission portion of a power transmission mechanism constructed to output a driving force from the engine through the power transmission portion, the hydraulic pump being of a variable displacement type in which a discharge quantity against a suction quantity is variable based on operation of an output adjusting member, and the discharge quantity against the suction quantity is varied based on a driven state of the engine,     a detecting mechanism for directly or indirectly detecting a load on an engine; and     a control mechanism for operating the output adjusting member based on a detection result of the detecting mechanism, in which     the control mechanism is formed to position the output adjusting member in a predetermined slanting position when the load on the engine is equal to or less than a predetermined value and to slant the output adjusting member from the predetermined slanting position toward a maximum slanting position according to an increase in the load when the load on the engine exceeds the predetermined value.

\* \* \* \* \*